United States Patent [19]

Schmidt et al.

[11] 4,425,163

[45] Jan. 10, 1984

[54] METHOD OF PRODUCING CEMENT CLINKER

[75] Inventors: Hans-Werner Schmidt, Frankfurt am Main; Hans Beisswenger, Bad Soden; Lothar Reh, Frankfurt am Main, all of Fed. Rep. of Germany; Albert Folliot, 8 rue Darcel, F 92100 Boulogne, France; Maurice Paliard, Chalon-sur-Saone, France

[73] Assignees: Creusot-Loire Enterprises, Suresnes; Lafarge Coppee, Paris; Albert Folliot, Boulogne, all of France; Metallgesellschaft AG, Frankfurt, Fed. Rep. of Germany

[21] Appl. No.: 349,876

[22] Filed: Feb. 18, 1982

[30] Foreign Application Priority Data

Feb. 28, 1981 [DE]  Fed. Rep. of Germany ....... 3107710

[51] Int. Cl.$^3$ ............................................... C04B 7/44
[52] U.S. Cl. ....................................... 106/100; 432/15
[58] Field of Search ........................... 106/100; 432/15

[56] References Cited

U.S. PATENT DOCUMENTS 3,895,955  7/1975  Kondo et al. ....................... 106/100

*Primary Examiner*—James Poer
*Attorney, Agent, or Firm*—Felfe & Lynch

[57] ABSTRACT

Cement clinker is produced in that raw cement powder is preheated in a suspension-type heat exchanger and is de-acidified in a fluidized bed and clinkered in a rotary kiln, and the clinker is subsequently cooled. A de-acidification of at least 95% is effected at a temperature above 850° C. in a circulation system comprising a fluidized bed reactor, a cyclone separator and a recycling duct. The carbonaceous fuel required for the calcining and clinkering processes is fed in an amount of at least 65% (related to the total heat requirement) to the de-acidifying fluidized bed reactor and in an amount of at least 10% (related to the total heat requirement) to the clinkering rotary kiln.

The fuel supplied to the de-acidifying fluidizing bed reactor is burnt near stoichiometrically in two stages with fluidizing gas and secondary gas. The ratios of the rates and volumes of fluidizing gas to secondary gas are so selected that a mean suspension density of 100 to 300 kg/m$^3$ is maintained in the zone between the inlet for fluidizing gas and the inlet for secondary gas, and a mean suspension density of 5 to 30 kg/m$^3$ is maintained above the inlet for secondary gas.

8 Claims, 1 Drawing Figure

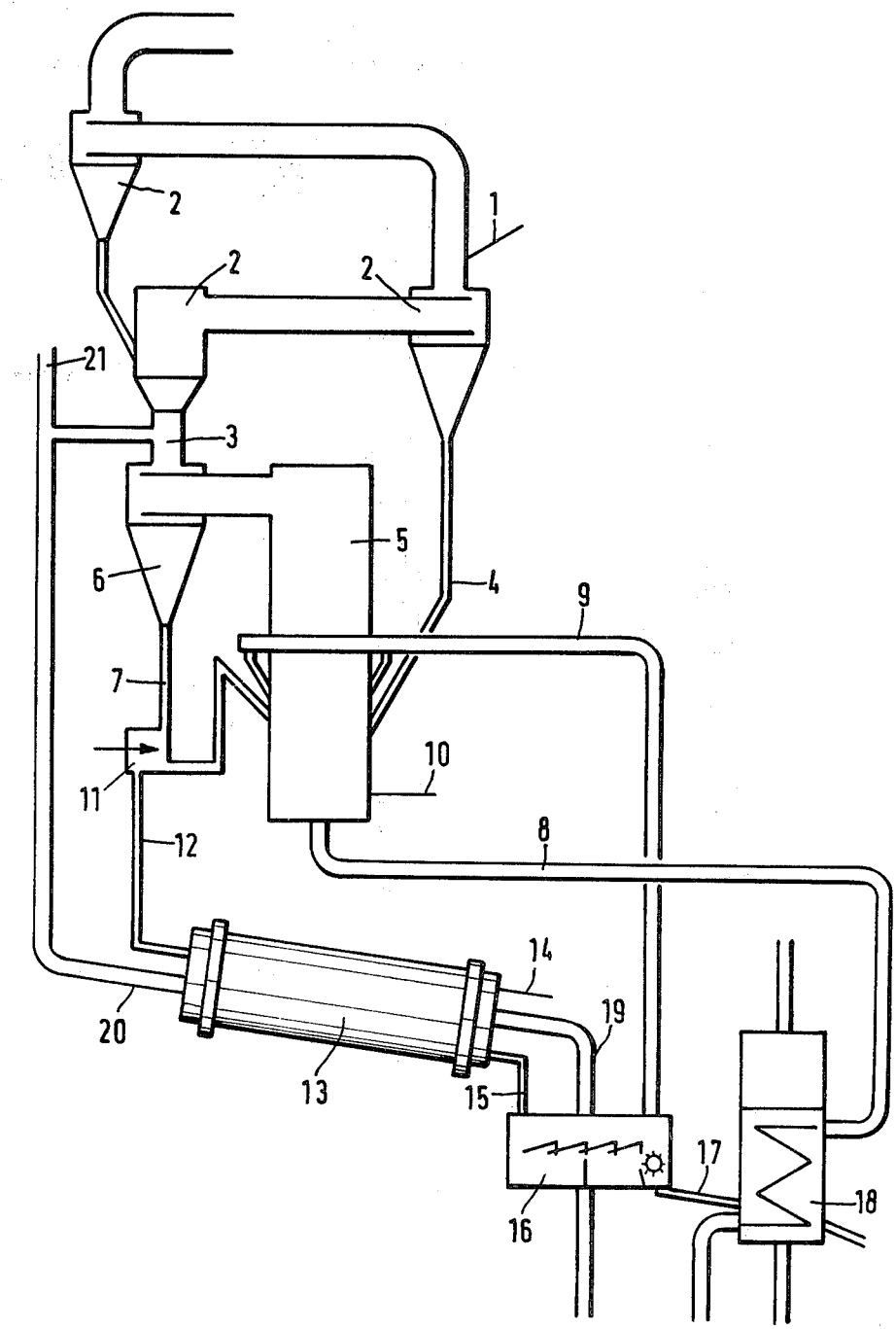

METHOD OF PRODUCING CEMENT CLINKER

CROSS REFERENCE TO RELATED APPLICATION

This application is related to our application Ser. No. 349,878, filed concurrently herewith entitled "Process of Producing Cement Clinker".

BACKGROUND OF THE INVENTION

1. Field of the Invention

This invention relates to a method of producing cement clinker comprising preheating the raw cement powder in a suspension-type heat exchanger, de-acidifying in a fluidized bed, clinkering in a rotary kiln, andd subsequently cooling the clinker.

2. Discussion of Prior Art

In the production of cement clinker it is generally usual to remove mechanical and chemically bound water from raw cement powder, to de-acidify the raw cement powder to a certain degree in a suspension-type heat exchanger and to use a rotary kiln for the further de-acidification and the clinkering.

Because a major part of the de-acidification is effected in the rotary kiln in that practice, it has the disadvantage that particularly for high through pout rates the rotary kiln must have large dimensions, which are not desirable from the aspect of plant engineering.

For this reason numerous efforts have been made to deacidify the raw cement powder as far as possible before it enters the rotary kiln. For this purpose, e.g., fuel has been fed separately to the lowermost stage of the suspension-type heat exchanger in order to effect a further heating and de-acidification of raw material (German Patent Publication No. 23 24 656). But the effect of that practice is limited because the raw material is subjected to the elevated temperature only for a short time.

A further development in the production of cement clinker calls for de-acidifying the raw material as far as possible in a separate unit, which is connected between the suspension-type heat exchanger and the rotary kiln and may consist of a heated pneumatic conveyor for feeding the raw material from the suspension-type heat exchanger to a cyclone, which precedes the rotary kiln (French Pat. No. 2,197,827), or of a fluidized bed reactor, from which the raw material is charged into the rotary kiln through a smoke chamber and a cyclone (German Patent Publication No. 23 44 094). In both cases it is difficult to control the residence time which is required for an adequate de-acidification, particularly because the grading of the raw material usually varies. It is also difficult to discharge the coarse particles.

It is an object of the invention to provide a process in which the disadvantages of the known processes, particularly of those described hereinbefore are avoided, which permits a virtually complete de-acidification of the raw cement powder before it is charged to th, rotary kiln and which can be carried out with a reasonable structural expenditure.

SUMMARY OF THE INVENTION

This object is accomplished by an improved process of the kind described first hereinbefore wherein:

A. a de-acidification of at least 95% is effected at a temperature about 850° C. in a circulation system comprising a de-acidifying fluidized bed reactor, a cyclone separator and a recycling duct, B. the fuel required for the calcining and clinkering processes is fed in an amount of at least 65% (related to the total heat requirement) to the de-acidifying fluidized bed reactor and in an amount of at least 10% (related to the total heat requirement) to the rotary kiln, C. the fuel supplied to the de-acidifying fluidized bed reactor is near stoichiometrically burnt in two combustion stages with at least two partial streams of oxygen-containing gas, one of said stream is supplied as fluidizing gas and the other is supplied on a higher level as secondary gas, and the ratio of the rates and volumes of fluidizing gas to secondary gas is maintained in the range from 1:1 to 1:10 so that a mean suspension density of 100 to 300 kg/m$^3$ is maintained in the zone between the inlets for fluidizings and for secondary gas and a mean suspension density of 5 to 30 kg/m$^3$ is maintained above the inlet for secondary gas.

Whereas in an orthodox fluidized bed, a dense phase is separated by a distinct change in density from the overlying gas space, the fluidized state in the fluidized bed reactor of the circulation system comprising the fluidized bed reactor, cyclone separator and recycling duct is distinguished by states of distribution having no distinct interface. There is no sudden change in density between a dense phase and the overlying dust space but the solids concentration in the reactor decreases continuously from bottom to top.

German Patent Publication No. 17 67 628 describes a process of carrying out endothermic processes, i.e., for burning certain kinds of raw cement powder, wherein the material to be treated in the process is pre-dehydrated and/or heated in a multistage suspension-type exchanger. This material is then fed through a separator to a fluidized-bed furnace, with which a recycling cyclone is associated, and the reaction product is finally withdrawn from the cycle comprising the fluidized-bed furnace and the recycling cyclone and fed to a multi-stage fluidized-bed cooler, so that a so-called circulating fluidized bed is employed. However, in that process the deacidification and clinkering are carried out in common fluidized bed. In the specific application, this has the disadvantage that the de-acidification is effected at the high clinkering temperatures, which would not be required for the de-acidification. As a result, exhaust gases at high temperatures are obtained at high volumetric rates and the fuel consumption is correspondingly high. Another disadvantage encountered with various starting materials resides in the observation that the quality of the product is not inferior to that obtained when the de-acidification and clinkering are carried out in two separate stages.

If the operating conditions of the process according to the invention are defined with the aid of the Froude and Archimedes numbers, the following ranges are obtained:

$$0.5 \leq \text{\textsterling} \times F_r^2 \times \frac{\rho_g}{\rho_k - \rho_g} \leq 50 \text{ or } 0.01 \leq Ar \leq 10$$

wherein $$Ar = -\frac{d_k^3 \times g(\rho_k - \rho_g)}{\rho_g \times v^2}$$

$$F_r^2 = \frac{u^2}{g \times d_k}$$

u=relative velocity of gas in m/sec
Ar=Archimedes' number
$\rho$g=density of gas in kg/m$^3$
$\rho$k=density of solid particle in kg/m$^3$
$d_k$=diameter of spherical particle in m
$v$=kinematic viscosity in m$^2$/sec
g=acceleration due to gravity in m/sec$^2$
$F_r$=Froude number Most of the fuel to be supplied to the de-acidifying fluidized bed reactor is fed below the secondary gas inlet. This measure and the division of all oxygen-containing gases required for the combustion into two partial streams, which are fed on different levels, result in a soft combustion in two stages so that hot spots in the fluidized bed reactor are avoided. In addition, the formation of nitrogen oxides is highly suppressed, e.g., to values below 100 ppm.

The fluidized bed reactor may be rectangular, square or circular in cross-section. The lower portion of the fluidized bed reactor may be conical. This is particularly desirable if the reactor is large in cross-section.

The gas velocities which are obtained in the fluidized bed reactor above the secondary gas inlet under normal pressure are usually above 5 m/sec and may be as high as 15 m/sec.

The fluidized bed reactor should have such a ratio of diameter to height that gas residence times of 0.5 to 8.0 seconds, preferably 1 to 4 seconds, are obtained.

The secondary gas may be fed at a plurality of levels or at a single level. In either case, it can be fed through a plurality of inlet openings. The secondary gas is fed at a level of at least 1 meter above the inlet for the fluidizing gas. Generally, the secondary gas is fed to the fluidized bed reactor at a point in the lower three tenths (30%) of the height of the fluidized bed reactor. If the secondary gas is fed at a plurality of levels, it is preferred that the uppermost level not be at a point above a height of 30% of the overall fluidized bed reactor height, measured from the bottom of the reactor. That height provides for a sufficiently large space for the first combustion stage, which effects an almost complete reaction between the carbonaceous material and the oxygen-containing fluidizing gas and ensures that in the upper reaction space, which is disposed above the secondary gas inlet, the oxygen will be reacted in accordance with the selected stoichiometric ratio.

The fuel may consist of fuel oil, coal, particularly brown coal (lignite), coal having a high ash content, such as washery refuse, or of oil shale or, if desired, domestic garbage. The use of a fuel having a high heating value is recommendable in the clinkering stage.

In connection with the division of the fuel it is particularly desirable to supply the de-acidifying fluidized bed reactor with 70 to 85% (related to the total heat requirement) of the fuel required for the calcining and clinkering processes and to supply the rotary kiln with 15 to 30% (related to the total heat requirement) of said fuel. The fuel fed to the clinkering rotary kiln serves mainly to heat the stream which leaves the de-acidifying fluidized bed reactor and to compensate the radiation losses.

In order to subject the raw material to a de-acidification of at least 95%, the residence time of the raw material should preferably amount to at least 3 to 15 minutes, particularly to 5 to 10 minutes. At the temperature to be maintained in the circulation system—the temperature lies preferably in the range from 950° to 1150° C. This residence time permits a successful processing of virtually all raw materials even if they have a large particle size range and contain course particles. Owing to the constant temperature in the circulation system and the defined residence times of the solids, the de-acidified product is highly homogeneous.

If a solid carbonaceous fuel is to be used, the solids should have a median particle diameter below 500 $\mu$m, preferably between 100 and 300 $\mu$m. The median diameter is defined in that the particle size of 50% by weight of the solids is larger and the particle size of 50% by weight of the solids is smaller than said median particle size.

The calcined cement powder is clinkered in the rotary kiln under conditions known per se at temperatures of about 1300° to 1450° C.

According to a preferred further feature of the invention, the cooling of the clinker is combined with the heating of oxygen-containing gas, at least part of which is supplied to the fluidized bed reactor. The cooling may be effected by direct-contact cooling and by indirect cooling.

The coolers may consist of coolers of known type, such as shaft coolers or grate coolers, particularly in combination.

The process economy will be improved if part of the oxygen-containing gas which has been indirectly heated in cooling the clinker is supplied as fluidizing gas to the fluidized bed reactor and at least part of the oxygen-containing which has been heated in direct contact with the clinker to be cooled is supplied as secondary gas to the fluidized bed reactor. Any remaining gas stream may be supplied to the suspension-type heat exchanger.

The entire exhaust gas from the de-acidifying circulation system is usually supplied to the suspension-type heat exchanger. The exhaust gas from the rotary kiln may also be fed to the suspension-type heat exchanger. But if the raw cement powder has relatively high contents of volatilizable alkalies, a smaller or larger part of said exhaust gas-depending on its alkali content—should by-pass the suspension-type heat exchanger. A by-passing of 100% of said exhaust gases may be required in an extreme case, if the alkali content is particularly high.

The process according to the invention affords numerous important advantages. For instance, the residence time of the raw material in the de-acidifying circulation system can be very precisely controlled so that there will be virtually no fluctuation in the degree to which the raw material is deacidified. Additionally, the temperature in the circulation system is virtually constant and temperature peaks which might result in volatilizing reactions are avoided. Such volatilizing reactions are not desired in that stage. The circulation system ensures also a constant supply of solids to the rotary kiln so that a clinker of high quality can be obtained. The de-acidification to a high degree effected in the de-acidifying circulation system relieves the clinkering rotary kiln, where virtually only the burning to form clinker is effected. For this reason the rotary kiln may be small so that the radiation of heat can be reduced and less energy required.

The process permits the use of low-grade fuels and does not require a grinding of the starting materials to a very small size. If starting materials are used which result in a so-called "natural" cement (starting materials comprising a homogeneous mixture of the cement-forming ingredients), a grinding to an even larger particle size will be sufficient. If the starting materials have a high alkali content so that a by-passing is required, less heat will be lost because less gases are withdrawn from the clinkering stage.

BRIEF DESCRIPTION OF DRAWING

The accompanying drawing is a flow diagram using representative symbols for various interconnected apparatuses used in carrying out the invention. The drawing can also be considered to be a side elevation of an apparatus useful in carrying out the invention.

DESCRIPTION OF SPECIFIC EMBODIMENT

Referring to the accompanying drawing, the raw cement powder is supplied at 1 to the suspension-type heat exchanger 2 (shown in a simplified form with two cyclone separators and one venturi reactor) and is preheated by the exhaust gases leaving the circulation system at 3. The preheated cement powder is fed in duct 4 to the circulating system for calcination.

The de-acidifying circulation system comprises the fluidized bed reactor 5, the cyclone separator 6 and the recycling duct 7. The fluidized bed reactor 5 is supplied with fluidizing gas through duct 8 and with secondary gas through duct 9, which suitably consists of an annular duct near the fluidized bed reactor 5. Fuel is charged through a lance 10.

The withdrawing device 11 is controlled by a lance and used to withdraw through duct 12 a continuous stream, which is fed to the rotary kiln 13, in which the solids are clinkered by being heated by means of fuel which is fed at a relatively low rate through a lance 14.

The cement clinker product is then supplied through a duct 15 to a grate cooler 16, which comprises a disintegrator, and through duct 17 to a shaft cooler 18. In the shaft cooler 18, the extracted heat is used to heat a gas stream, which is supplied through duct 8 to the fluidized bed reactor 5 as fluidizing gas. The air which has been heated in the grate cooler 16 is first supplied through duct 19 to the rotary kiln 13. The exhaust gas from the rotary kiln 13 is supplied through duct 20 to the suspension-type heat exchanger 2.

A partial stream of the exhaust gas or in an extreme case the entire gas stream may be conducted past the suspension-type heat exchagner 2 in duct 21 if this is required. That exhaust gas is then cooled in the usual manner in a gas cooler (not shown) and purified.

EXAMPLE 1

By means of the feeder 1, the suspension-type heat exchanger 2 was fed at a rate of 3100 kg/h with raw cement powder having a median particle diameter of 30 $\mu$m. The raw cement powder consisted of 2400 kg limestone ($CaCO_3$)
250 kg quartz sand ($SiO_2$)
450 kg clay (high alkali content)

The raw cement powder was preheated to about 800° C. in the suspension-type heat exchanger 2 by the exhaust gas at 1000° C., which left the circulation system at 3. The raw cement powder was then fed through duct 4 into the fluidized bed reactor 5. The fluidized bed reactor 5 was also fed through duct 10 at a rate of 500 kg/h with coal having a median particle diameter of 200 $\mu$m and a net heating value $H_u$ of 12 MJ/kg through duct 8 at a rate of 560 $m_N^3$/h with fluidizing gas at 420° C. and through duct 9 at a rate of 1320 $m_n^3$/h with secondary gas at 720° C.

A temperature of 1000° C. was obtained in the circulation system comprising the fluidized bed reactor 5, the cyclone separator 6 and the recycling duct 7. As a result of the rates and proportion of the gas streams, the mean suspension density in the fluidized bed reactor 5 amounted to 150 kg/$m^3$ below the secondary gas inlet 9 and to 10 kg/$m^3$ above the secondary gas inlet 9. In the circulation system, the cement powder had a residence time of about 8 minutes and was subjected to a de-acidification of about 99.2%.

Calcined cement powder at a rate of 2000 kg/h was withdrawn by means of the withdrawing device 11 and was fed to the rotary kiln 13. The rotary kiln was also supplied through lance 14 at a rate of 47 kg/h with coal having a particle size of 20%>90 $\mu$m and a net heating value $H_u$ of 25 MJ/kg and through duct 19 at a rate of 290 $m_N^3$ with air which had been heated to 1090° C. in the grate cooler 16. The maximum temperature in the rotary kiln 13 amounted to 1400° C. The clinker was then supplied through duct 15 into the grate cooler 16 and was cooled in the latter in direct contact with air supplied at a rate of 1610 $m_N^3$/h. The heated air was supplied in part to the rotary kiln 13 and in part as secondary air through duct 9, as described hereinbefore. The clinker was cooled further in the shaft cooler 18, in which air at a rate of 560 $m_N^3$/h was indirectly heated. The heated air was then supplied to the fluidized bed reactor 5 as fluidizing gas at a temperature of 420° C. 2000 kg clinker were produced per hour.

Owing to its high alkali content, the entire exhaust gas leaving the rotary kiln 13 was conducted in duct 21 past the suspension-type heat exchanger 2 and was cooled and purified.

EXAMPLE 2

A starting material was used which formed a natural cement, in which the ingredients required to make cement were contained in the correct proportions and in a homogeneous distribution. The median particle diameter was 150 $\mu$m. The starting material was fed at a rate of 3100 kg/h and had a relatively low alkali content.

The process was carried out basically in the same manner as in Example 1. But 75% of the exhaust gas from the rotary kiln could be supplied to the suspension-type heat exchanger 2. This involved certain changes in the rates at which air and fuel were supplied.

The starting material fed through 1 was heated to 800° C. in the suspension-type heat exchanger 2 by a heat exchange with the exhaust gases of the circulation system and of the rotary kiln 13 and was then supplied through duct 4 to the fluidized bed reactor 5. Fuel at a rate of 434 kg/h was supplied through lance 10 and had a net heating value $H_u$ of 12 MJ/kg and a median particle diameter of 200 um. Fluidizing gas at 480° C. was supplied at a rate of 485 $m_N^3$/h through duct 8 and secondary gas at 820° C. was supplied at a rate of 1140 $m_N^3$/h through duct 9. A temperature of 1050° C. was obtained in the circulation system. The mean suspension density amounted to about 9 kg/$m^3$ above the inlet of the secondary gas duct 9 and to about 160 kg/$m^3$ below said inlet.

The mean residence time in the circulation system amounted amounted again to 8 minutes. A de-acidification of 99.3% was effected.

By means of the withdrawing device 11 and the duct 12, calcine at a rate of 2000 kg/h was continuously charged to the rotary kiln 13. The latter was also supplied at a rate of 47 kg/h through duct 14 with coal having a particle size of 20%>90 μm and a net heating value $H_u$ of 25 MJ/kg and through duct 19 at a rate of 290 $m_N^3$/h with air at 1090° C. (from the grate cooler 16). A temperature of 1400° C. was obtained in the rotary kiln 13.

After a sufficiently long clinkering treatment, clinker at a rate of 2000 kg/h was discharged through duct 15 into the grate cooler 16 and was cooled there in direct contact with air supplied at a total rate of 1430 $m_N^3$/h. Respective parts of the heated air were supplied to the rotary kiln 13 and the secondarair duct 9, as described hereinbefore. The clinker was then cooled in a succeeding shaft cooler 18, partly indirectly and in combination with the heating of air supplied at a rate of 485 $m_N^3$/h. The heated air at a temperature of 480° C. was supplied through duct 8 to the fluidized bed reactor 5. 2000 kg clinker were produced per hour.

Exhaust gas at a rate fo 300 $m_N^3$/h left the rotary kiln 13 and owing to its relatively low alkali content 75% of said exhaust gas were supplied to the suspension-type heat exchanger 2. The remaining 25% were cooled and purified in a gas cooler (not shown).

What is claimed is:

1. In a method of producing cement clinker comprising preheating the raw cement powder in a suspension-type heat exchanger, de-acidifying the so-preheated raw cement powder in a fluidized bed, clinkering the so de-acidified material in a rotary kiln and subsequently cooling the clinker, the improvement comprising:
   (a) de-acidifying said raw cement powder at a temperature above 850° C. to a degree of at least 95% in a de-acidification circulation system comprising a de-acidification fluidized bed reactor, a cyclone separator and a recycling duct;
   (b) feeding at least 65% relative to the total heat requirement, of the fuel required for the calcining and clinkering processes to the de-acidifying fluidized bed reactor and at least 10%, relative to the total heat requirement, to the rotary kiln;
   (c) near stoichiometrically burning the fuel supplied to the de-acidifying fluidized bed reactor in at least two combustion stages with at least two partial streams of oxygen-containing gas, one of said streams being supplied as fluidizing gas and the other being supplied on a higher level as secondary gas, the ratio of the rates and volumes of fluidizing gas to secondary gas being maintained in the range from 1:1 to 1:10 so that a mean suspension density of 100 to 300 kg/m$^3$ is maintained in the zone between the inlet for fluidizing gas and the inlet for secondary gas; and
   (d) maintaining a mean suspension density of 5 to 30 kg/m$^3$ above the inlet for secondary gas.

2. A process according to claim 1, wherein the de-acidifying fluidized bed reactor is supplied with 70 to 85%, relative to the total heat requirement, of the fuel required for the calcining and clinkering processes and the clinkering rotary kiln is supplied with 15 to 30%, relative to the total heat requirement, of said fuel.

3. A process according to claim 1, wherein the residence time of the solids in the de-acidifying circulation system amounts to 3 to 15 minutes.

4. A process according to claim 1, wherein a temperature in the range of 950° to 1150° C. is maintained in the de-acidifying circulation system.

5. A process according to claim 1, wherein solid carbonaceous fuels are used which have a median particle diameter $d_p$ 50 below 500 μm.

6. A process according to claim 1, wherein the cooling of the clinker is combined with the heating of oxygen-containing gas, at least part of which is supplied to the de-acidifying fluidized bed reactor.

7. A process according to claim 6, wherein the clinker is cooled with an oxygen-containing gas, whereby the oxygen containing gas becomes heated directly or indirectly.

8. A process according to claim 6, wherein at least part of the oxygen-containing gas which has been indirectly heated by heat exchange with the clinker is supplied as fluidizing gas to the de-acidifying fluidized bed reactor and at least part of the oxygen-containing gas which has been heated in direct contact with the clinker removed from the rotary kiln is supplied as secondary gas to the de-acidifying fluidized bed reactor.

* * * * *